No. 824,136. PATENTED JUNE 26, 1906.
F. H. NICHOLS.
PLOW.
APPLICATION FILED DEC. 19, 1905.
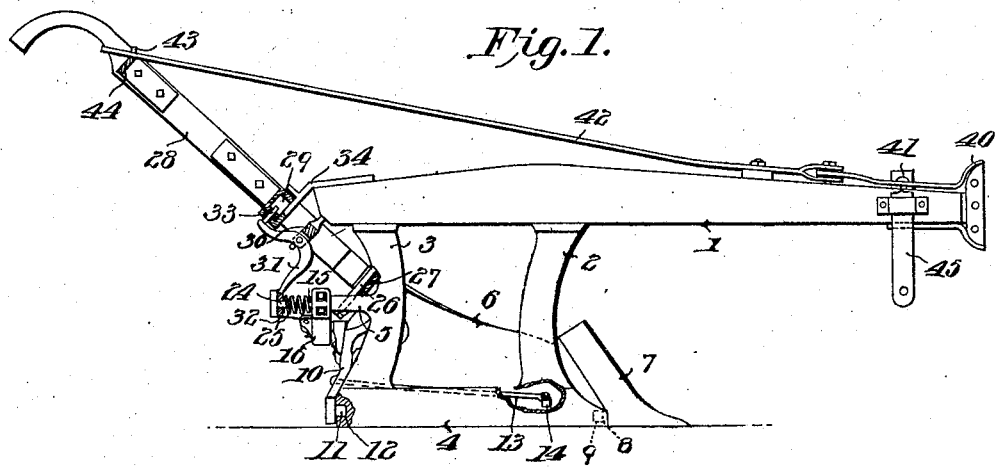
Fig. 1.
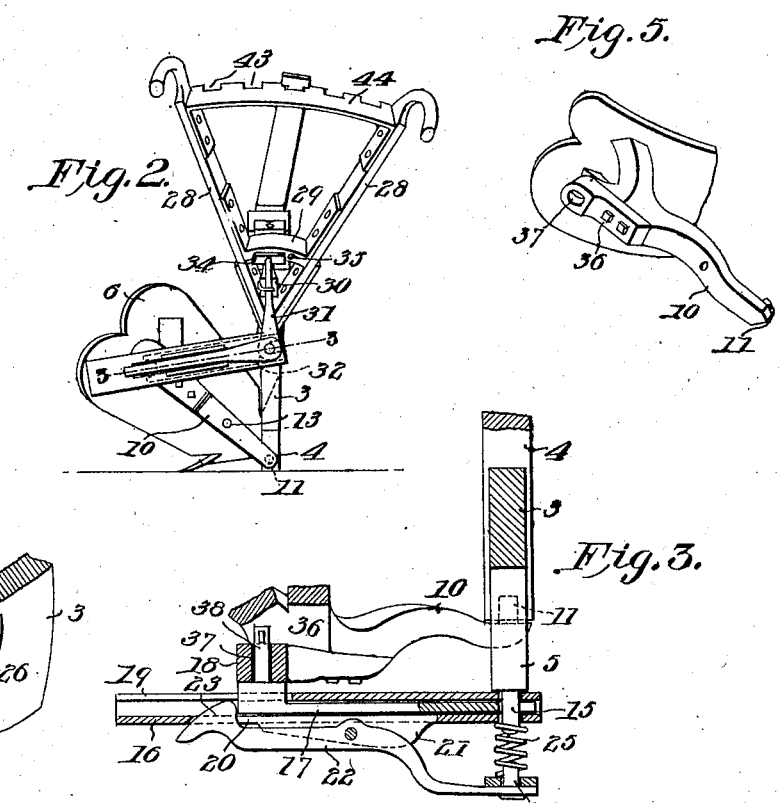
Fig. 2. Fig. 5. Fig. 4. Fig. 3.
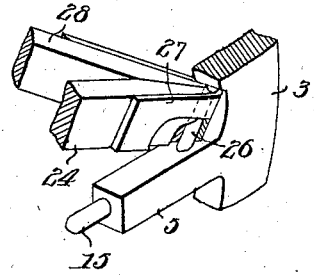
Witnesses
Franklin H. Nichols  Inventor
by C. A. Snow & Co.
Attorneys

UNITED STATES PATENT OFFICE.

FRANKLIN H. NICHOLS, OF CHETEK, WISCONSIN.

PLOW.

No. 824,136.  Specification of Letters Patent.  Patented June 26, 1906.

Application filed December 19, 1905. Serial No. 292,453.

*To all whom it may concern:*

Be it known that I, FRANKLIN H. NICHOLS, a citizen of the United States, residing at Chetek, in the county of Barron and State of Wisconsin, have invented a new and useful Plow, of which the following is a specification.

This invention relates to plows, and especially to that class of plows which are known as "swivel-plows," and which are provided with a swiveled reversible moldboard which may be changed from a right to a left hand position, and vice versa, at the end of each furrow, thus avoiding the necessity of plowing around the field.

The present invention has for its object to improve and simplify the construction and operation of this class of plows; and with these and other ends in view, which will readily appear as the nature of the invention is better understood, the same consists of the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be made when desired.

In said drawings, Figure 1 is an elevation, partly in section, of the landside of a plow constructed in accordance with the principles of the invention. Fig. 2 is a rear elevation. Fig. 3 is a sectional detail view taken on the plane indicated by the line 3 3 in Fig. 2 and on an enlarged scale. Fig. 4 is a perspective detail view illustrating the pivotal connection between the handles and the plow frame on an enlarged scale. Fig. 5 is a perspective detail view of a portion of the moldboard showing the brace 10 connected therewith.

Corresponding parts in the several figures are indicated throughout by similar characters of reference.

In the manufacture of the present device, which is an improvement upon the swivel-plow for which Letters Patent of the United States No. 644,999 were granted to me on the 6th day of March, 1900, I prefer to avail myself of a wooden beam 1 to the under side of which is secured a frame comprising front and rear standards 2 3, a landside 4, and a bracket 5, which latter extends rearwardly from the rear standard. The reversible or double moldboard 6 has a share 7, rigidly connected therewith; and said share is provided with a rearwardly-extending pintle 8, pivoted in a recess 9 at the front end of the landside. The moldboard is provided on its under side near its rear end with a massive brace 10, bifurcated at its inner end, where it is securely bolted or otherwise suitably fastened to the moldboard and provided near its outer end with a pintle 11, journaled in a recess 12 in the heel end of the landside with which the moldboard is thus pivotally connected. A reinforcing-rod, as 13, preferably connects the brace 10 with a lug 14 upon the under side of the moldboard near the front end of the latter.

Pivoted upon a pin 15 at the rear end of the bracket 5 is a casing 16, in which is mounted a slide 17, having a head 18, which projects through a slot 19 in the front side of the casing. The rear side of the latter is provided with a slot 20, adjacent to which are formed flanges 21, between which is pivotally supported a lever 22, having a hook-shaped outer end 23, which is adapted to engage the head portion 18 of the slide 17, so as to restrain the latter from outward movement. The lever 22 is provided at its inner end with a pin 24, which coöperates with the pin 15 to support a spring 25, whereby the lever 22, which, as will be seen, constitutes a latch member, is operated.

The bracket 5 is connected with the standard 3 by an obliquely-disposed pivot 26, engaging a bearing 27, formed at the converging ends of the handles 28. Said handles are securely connected together and spaced apart by means of a transverse brace 29. The rear end of the plow-beam is provided with a downwardly-extending obliquely-disposed bifurcated bracket 30, which pivotally supports a lever 31, one end of which terminates in an eye 32, engaging the pin 24 of the latch-lever 22, so as to be operable conjointly with the latter by the spring 25. The other end of the lever 31 is provided with a pin 33, which extends through a perforation in a guide member 34, connected with the rear end of the plow-beam, and is adapted to engage one of a plurality of recesses 35 in the brace 29 that connects the handles.

The brace member 10, which connects the moldboard with the heel end of the landside, is provided with a bracket 36, suitably bolted or otherwise secured thereto and having an aperture 37 pivotally engaging a pin 38, extending from the head portion 18 of the slide 17.

The operation of the invention, as thus far described, will be readily understood by those skilled in the art to which it appertains. When the moldboard is in operative position, it is locked by the latch-lever 22, engaging the head 18 of the slide 17, which is pivotally connected with the moldboard through the medium of the brace 10 of the latter. By depressing the inner end of the latch-lever the slide will be released and permitted to travel outward in the casing 16, thus permitting the moldboard to swing upon its pivot and to be reversed from a right-hand to a left-hand position, or vice versa, it being automatically locked at the terminal of the movement by means of the spring-actuated latch-lever. When the latter is operated to disengage the slide 17, it also actuates the lever 31 to withdraw the pin 33 from engagement with the recess in the cross-brace 29, connecting the handles. The latter may thus be rocked or swung upon the pivot 26, enabling them to assume a proper and natural position for operation.

In plows of this class it is customary to attach the handles rigidly to the beam, and the movement of the moldboard being usually through an arc somewhat exceeding one hundred and eighty degrees it follows that when the moldboard is in operative position the handles will be somewhat tilted to one side or to the other. Again, when the plow is used for hillside-work, even if the moldboard swings only through an arc of exactly one hundred and eighty degrees, the operator will be cramped and will be compelled either to crowd one of the handles or to walk with one foot in the furrow and the other on the land. By the herein-described arrangement of the pivoted handles the position of said handles may be shifted when the moldboard is reversed, and the unlocking of the handles to permit of their being shifted is accomplished simultaneously with the unlocking of the moldboard, so that the reversal of the plow may be accomplished speedily and effectively.

In the drawings has been illustrated a clevis member 40 the arms of which are pivotally connected with the plow-beam at 41, one of said arms being extended rearwardly and connected with one end of an operating-lever 42, the rear end of which is adapted to engage any one of a plurality of notches 43 in a cross-bar 44, connecting the handles, thus enabling the position of the draft-clevis to be shifted laterally. Bracket-arms 45 have also been illustrated as connected with the plow-beam for the purpose of carrying a guide-wheel, which latter, however, is not shown.

This invention, as will be seen from the foregoing, is simple in construction, easily manipulated, and it has proven in practice to be thoroughly efficient for the purposes for which it is designed.

Having thus described the invention, what is claimed is—

1. A plow having a swiveled moldboard, means for supporting the same in operative position, a pair of handles disposed upon an oblique pivot, and means for securing said handles in operative position.

2. In a plow, a swiveled moldboard movable from a right-hand to a left-hand position, and vice versa, in combination with a pair of handles suitably connected and supported upon a single pivot and movable from a right-hand to a left-hand position, and vice versa.

3. A plow-beam, a frame connected with the same and including a pair of standards, a landside and a rearward-extending bracket, an obliquely-disposed pin connecting said bracket with the rear standard from which it extends, a pair of handle members pivoted upon said pin, and means for retaining said handles in adjusted position.

4. In a plow, a beam, a frame connected therewith and including front and rear standards, a landside and a bracket extending rearwardly from the rear standard, a reversible moldboard including a share and a brace connected pivotally with the front and rear ends of the landside, a bracket connected with the brace, a casing connected pivotally with the bracket extending from the rear standard, a slide in said casing having a head pivotally connected with the bracket upon the moldboard-brace, and a spring-actuated latch-lever connected with the casing and adapted to engage the head of the slide movable in said casing.

5. A plow-beam, a frame connected with said beam and having a rearwardly-extending bracket, a moldboard connected pivotally with said frame, a casing pivoted upon the bracket, a slide movable in said casing and having pivotal connection with the moldboard, a latch-lever pivoted upon the casing and adapted to engage the slide, an obliquely-disposed pin connecting the bracket with the frame from which it extends, handles pivoted upon said pin, a cross-bar connecting said handles and having recesses therein, a lever pivoted upon the plow-beam and having a pin adapted to engage the recesses in the cross-brace the opposite end of said lever being extended in the path of the latch-lever and connected loosely with the latter, and a single spring operating to hold the two latch-levers in locking position.

In testimony that I claim the foregoing as my own I have hereto affixed my signature in the presence of two witnesses.

FRANKLIN H. NICHOLS.

Witnesses:
A. T. GALBY,
I. R. GAVIN.